US009024818B2

(12) United States Patent
Okamoto

(10) Patent No.: US 9,024,818 B2
(45) Date of Patent: May 5, 2015

(54) COMMUNICATION DEVICE

(75) Inventor: Tetsuo Okamoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 379 days.

(21) Appl. No.: 13/434,613

(22) Filed: Mar. 29, 2012

(65) Prior Publication Data

US 2012/0249370 A1 Oct. 4, 2012

(30) Foreign Application Priority Data

Mar. 29, 2011 (JP) ................................ 2011-071386

(51) Int. Cl.
*G01S 3/16* (2006.01)
*H01Q 3/26* (2006.01)

(52) U.S. Cl.
CPC .................................. *H01Q 3/2611* (2013.01)

(58) Field of Classification Search
USPC ................................. 342/383, 354, 368, 408
See application file for complete search history.

(56) References Cited

U.S. PATENT DOCUMENTS

| | | | | |
|---|---|---|---|---|
| 2008/0075037 A1* | 3/2008 | Guo et al. | | 370/329 |
| 2008/0293371 A1 | 11/2008 | Kishigami et al. | | |
| 2011/0200089 A1* | 8/2011 | Umeda et al. | | 375/232 |

FOREIGN PATENT DOCUMENTS

| | | |
|---|---|---|
| JP | 10-308130 A | 11/1998 |
| JP | 2001-223516 | 8/2001 |
| JP | 2001-230621 A | 8/2001 |
| JP | 2007-129697 A | 5/2007 |
| JP | 2010-081550 A | 4/2010 |

OTHER PUBLICATIONS

Office Action dated Aug. 12, 2014, from corresponding Japanese Patent Application No. 2011-071386 (Concise Explanation included), 4 total pages.

* cited by examiner

*Primary Examiner* — Harry Liu
(74) *Attorney, Agent, or Firm* — Duane Morris LLP

(57) ABSTRACT

Communication systems and methods are disclosed. A number of interference sources are obtained based on received signals. A communication is performed using a plurality of antennas and a transmission directivity of the antennas is controlled when transmitting signals. At least null-steering from among null-steering and beam-forming is performed in relation to the transmission directivity of the antennas, when the number of interference sources is less than a first threshold value. Only the beam-forming is performed from among the null-steering and the beam-forming in relation to the transmission directivity of the antennas, when the number of interference sources is greater than the first threshold value.

15 Claims, 8 Drawing Sheets

COMMUNICATION DEVICE

CROSS-REFERENCE TO RELATED APPLICATION

The present application claims priority under 35 U.S.C. §119 to Japanese Patent Application No. 2011-071386, filed on Mar. 29, 2011, entitled "COMMUNICATION DEVICE AND METHOD FOR COMMUNICATION". The content of which is incorporated by reference herein in its entirety.

FIELD

Embodiments of the present disclosure relate generally to communication devices, and more particularly relate to a communication device comprising multiple antennas.

BACKGROUND

Some communication devices perform transmission using an adaptive array antenna system that adaptively controls directivity of an array antenna composed of multiple antennas. Such an adaptive array antenna system may comprise beam-forming/beam-steering and null-steering. In the beam-forming, a transmission directivity of an array antenna is controlled so that a beam is faced in a desired direction (e.g., a direction in which a communication partner device is located), and null control is intentionally not performed. Alternatively, in null-steering, the transmission directivity of the array antenna is controlled so that the null faces in a direction in which interference should not be imparted during transmission (e.g., a direction in which a communication device other than the communication partner device is located; hereinafter referred to as a "direction of suppressed interference"), and beam control is intentionally not performed.

In null-steering, because a null where transmission gain decreases is formed in the transmission directivity of the array antenna due to the effects of the null, a transmission gain in the desired direction tends to be small compared to a transmission gain for beam steering. Similarly, when simultaneously performing null-steering and beam-forming, transmission gain in the desired direction tends to be small compared to when only beam steering is performed. Therefore, the transmission performance of the communication device may be degraded.

SUMMARY

Communication systems and methods are disclosed. A number of interference sources are obtained based on received signals. A communication is performed using a plurality of antennas and a transmission directivity of the antennas is controlled when transmitting signals. At least null-steering from among null-steering and beam-forming is performed in relation to the transmission directivity of the antennas, when the number of interference sources is less than a first threshold value. Only the beam-forming is performed from among the null-steering and the beam-forming in relation to the transmission directivity of the antennas, when the number of interference sources is greater than the first threshold value. In this manner, the transmission performance of the communication device is improved.

In an embodiment, a communication device comprises an interference-count acquiring module and a communication module. The interference-count acquiring module obtains a number of interference sources based on received signals received by the communication device. The communication module performs communication using a plurality of antennas and controls a transmission directivity of the antennas when transmitting signals. The communication module further performs at least null-steering from among null-steering and beam-forming in relation to the transmission directivity of the antennas, when the number of interference sources is less than a first threshold value. The communication module further performs only the beam-forming from among the null-steering and the beam-forming in relation to the transmission directivity of the antennas, when the number of interference sources is greater than the first threshold value.

In another embodiment, a communication device comprises a communication module and an interference-count acquiring module. The communication module performs communication using a plurality of antennas and simultaneously performs null-steering and beam-forming in relation to a transmission directivity of the antennas when transmitting signals. The communication module further performs reduce a suppressing effect from the null-steering when a number of interference sources is greater than a first threshold value. The interference-count acquiring module obtains the number of interference sources based on received signals received by the communication module.

In a further embodiment, a communication device comprises a reception-power acquiring module and a communication module. The reception-power acquiring module obtains a reception power of received signals from a communication partner device received by the communication device. The communication module performs communication using a plurality of antennas and controls a transmission directivity of the antennas when transmitting signals. The communication module further performs at least null-steering from among null-steering and beam-forming in relation to the transmission directivity when transmitting signals to the communication partner device, if the reception power is greater than a threshold value. The communication module further performs only the beam-forming from among the null-steering and the beam-forming in relation to the transmission directivity of the antennas when transmitting signals to the communication partner device, if the reception power is less than the threshold value.

In a further embodiment, a communication device comprises a reception-power acquiring module and a communication module. The reception-power acquiring module obtains a reception power of received signals from a communication partner device that are received by the communication device. The communication module performs communication using a plurality of antennas and controls a transmission directivity of the antennas when transmitting signals. The communication module further performs null-steering and beam-forming in relation to the transmission directivity of the antennas when transmitting signals to the communication partner device, and reduce a suppressing effect of the null-steering when the reception power is less than a threshold.

In a further embodiment, a method for operating a communication device obtains a number of interference sources based on received signals, and performs a communication using a plurality of antennas and controlling a transmission directivity of the antennas when transmitting signals. The method also performs at least null-steering from among null-steering and beam-forming in relation to the transmission directivity of the antennas, when the number of interference sources is less than a first threshold value. The method further performs only the beam-forming from among the null-steering and the beam-forming in relation to the transmission directivity of the antennas, when the number of interference sources is greater than the first threshold value.

In a further embodiment, a computer readable storage medium comprising computer-executable instructions for operating a communication device. The method executed by the computer-executable instructions obtains a number of interference sources based on received signals, and performs a communication using a plurality of antennas and controlling a transmission directivity of the antennas when transmitting signals. The method also performs at least null-steering from among null-steering and beam-forming in relation to the transmission directivity of the antennas, when the number of interference sources is less than a first threshold value. The method further performs only the beam-forming from among the null-steering and the beam-forming in relation to the transmission directivity of the antennas, when the number of interference sources is greater than the first threshold value.

In a further embodiment, a computer readable storage medium comprising computer-executable instructions for operating a communication device. The method executed by the computer-executable instructions obtains a number of interference sources based on received signals. The method also performs communication using a plurality of antennas and simultaneously performing null-steering and beam-forming in relation to a transmission directivity of the antennas when transmitting signals. The method further reduces a suppressing effect from the null-steering when the number of interference sources is greater than a first threshold value.

In a further embodiment, a computer readable storage medium comprising computer-executable instructions for operating a communication device. The method executed by the computer-executable instructions obtains a reception power of received signals from a communication partner device received by the communication device. The method also performs communication using a plurality of antennas and controls a transmission directivity of the antennas when transmitting signals. The method further performs at least null-steering from among a null-steering and beam-forming, if the reception power is greater than a threshold value, in relation to the transmission directivity when transmitting signals to the communication partner device. The method further performs only the beam-forming from among the null-steering and the beam-forming, if the reception power is less than the threshold value, in relation to the transmission directivity of the antennas when transmitting signals to the communication partner device.

In a further embodiment, a computer readable storage medium comprising computer-executable instructions for operating a communication device. The method executed by the computer-executable instructions obtains a reception power of received signals from a communication partner device that are received by the communication device. The method also performs communication using a plurality of antennas and controls a transmission directivity of the antennas when transmitting signals. The method further performs null-steering and beam-forming in relation to the transmission directivity of the antennas when transmitting signals to the communication partner device, and reduce a suppressing effect of the null-steering when the reception power is less than a threshold.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a communication between a mobile communication device such as a mobile phone and a base station. Embodiments of the disclosure, however, are not limited to such base station-mobile phone communication, and the techniques described herein may be utilized in other applications. For example, embodiments may be applicable to relay stations, wireless modems, digital music players, personal digital assistance (PDA), personal handy phone system (PHS), lap top computers, TV's, GPS's or navigation systems, display monitors, and other communication device communicating with a base station, an access point base station, or other base station that controls the transmission directivity of multiple antennas.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
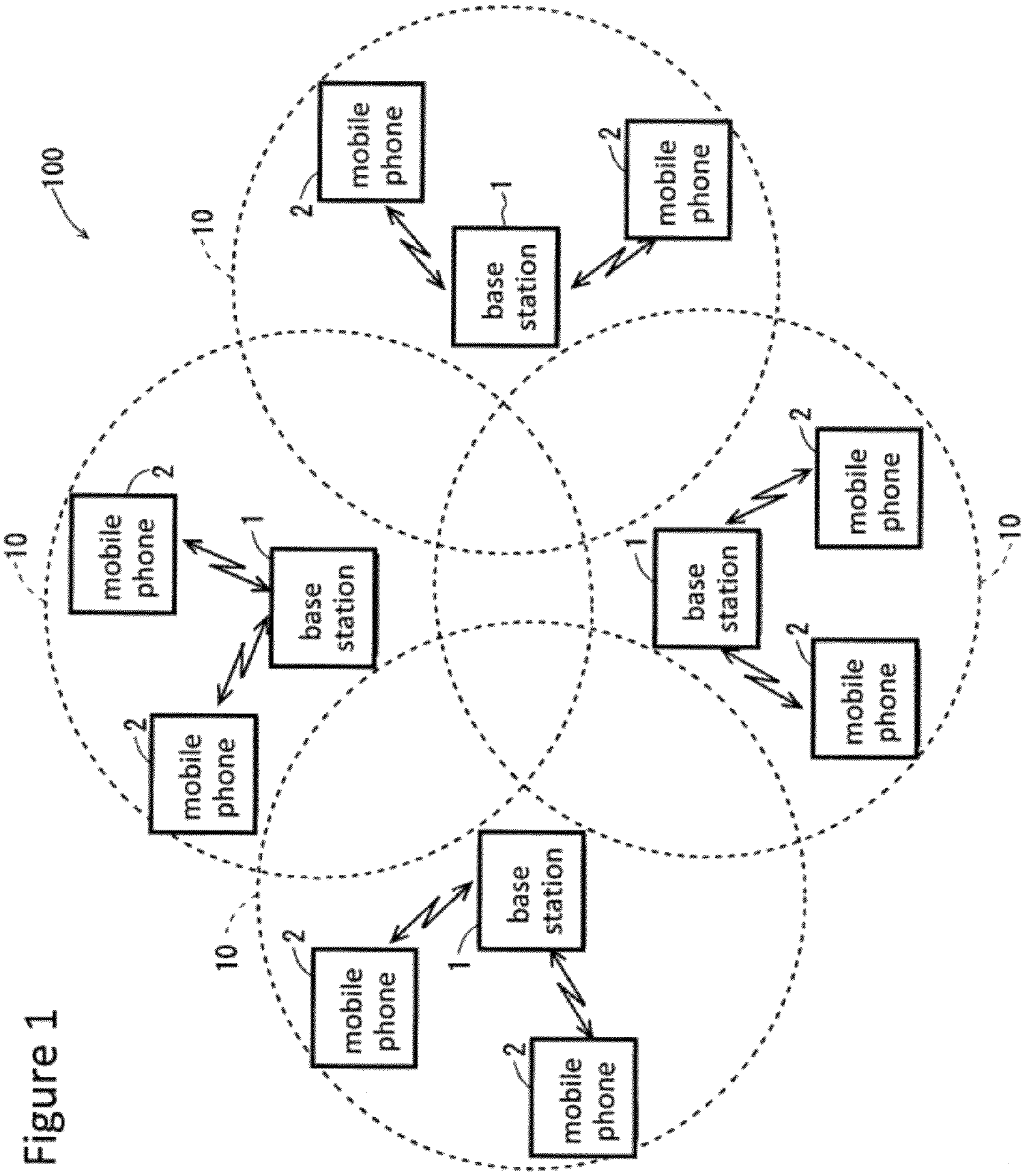
FIG. 1 is an illustration of an exemplary diagram showing a communication environment according to an embodiment of the disclosure.

FIG. 1 is an illustration of an exemplary diagram showing a communication environment 100 comprising a communication device such as base station 1 according to an embodiment of the disclosure. The base station 1 performs communication with communication terminals such as mobile phones 2 and other communication terminals.

The communication environment 100 comprises multiple base stations 1, and each of the base stations 1 performs communication with multiple mobile phones 2. A service area 10 of each base station 1 partially overlaps with the service areas 10 of the surrounding base stations 1. Because only four instances of the base stations 1 are shown in FIG. 1, there are only two or three surrounding base stations 1 for each of the base stations 1, but there may be, for example, six surrounding base stations 1 for each of the base stations 1.

The multiple base stations 1 are coupled to a network (not illustrated), and are able to communicate with each other through the network. Moreover, a server device (not illustrated) is coupled to the network, and each of the base stations 1 is able to communicate with the server device through the network.

Figure 2:
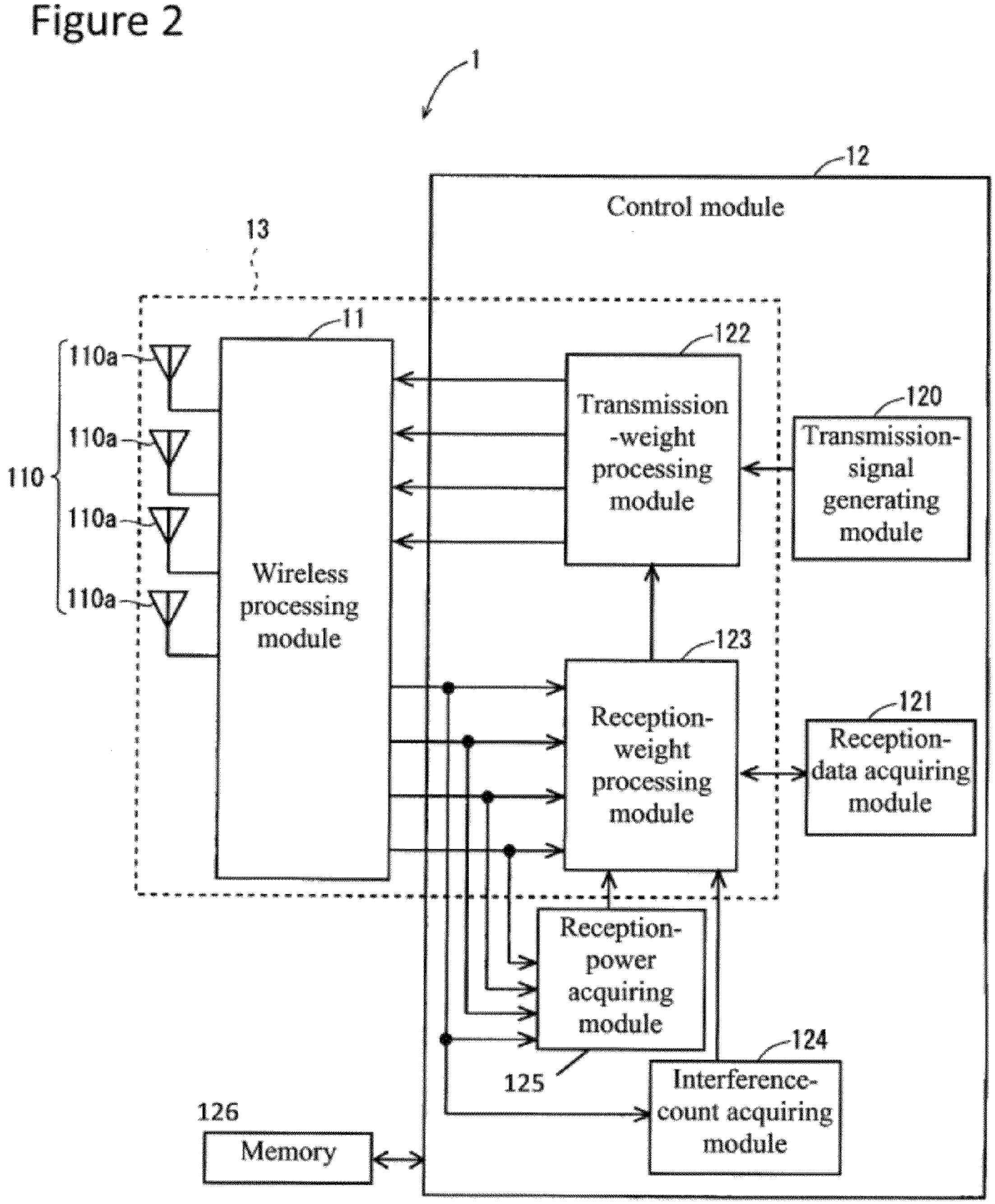
FIG. 2 is an illustration of an exemplary functional block diagram of a base station according to an embodiment of the disclosure.

FIG. 2 is an illustration of an exemplary functional block diagram of a base station 1 according to an embodiment of the present disclosure. The base station 1 comprises an array antenna that acts as a transmitting and receiving antenna, and is able to control the directivity of the array antenna using an adaptive array antenna system.

The base station 1 comprises a wireless processing module 11 and a control module 12 that controls the wireless processing module 11. The wireless processing module 11 comprises an array antenna 110 composed of multiple antennas 110*a*. The wireless processing module 11 performs amplification processing, down-conversion, and analog to digital (A/D) processing, and the like for each of multiple received signals received by the array antenna 110, and generates and outputs multiple baseband received signals.

The wireless processing module 11 conducts digital to analog (D/A) conversion processing, up-conversion, amplification processing, and the like with respect to a plurality of base band transmission signals generated at the control module 12 to generate a plurality of transmission signals in a carrier band. The wireless processing module 11 respectively inputs the plurality of transmission signals generated in the carrier band into the plurality of antennas 110*a* comprising the array antenna 110. Thereby, transmission signals are wirelessly transmitted from each antenna 110*a*.

The control module 12 comprises a transmission-signal generating module 120, a reception-data acquiring module 121, a transmission-weight processing module 122, a reception-weight processing module 123, an interference-count acquiring module 124, a reception-power acquiring module 125, a memory 126, and other module.

The control module 12 is configured to support functions of an electronic device such as the base station 1. The control module 12 may control operations of the base station 1 so that processes of the base station 1 are suitably performed. For example, the control module 12 controls and or operates the wireless processing module 11, the transmission-signal generating module 120, the reception-data acquiring module 121, the transmission-weight processing module 122, the reception-weight processing module 123, the interference-count acquiring module 124, and the reception-power acquiring module 125. The control module 12 can accordingly execute various applications such as a communication function, or other function.

The control module 12, may be implemented or realized with a general purpose processor, a content addressable memory, a central processing unit (CPU), a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The transmission-signal generating module 120 generates transmission data that should be transmitted to the mobile phone 2, which is the target or destination mobile phone (communication partner device) of the base station 1. The transmitted signal generation module 120 can generate transmitted baseband signals comprising the generated transmit data. A number of the generated transmitted baseband signals is same as a number of antennas 110*a* of the array antenna 110.

The transmission-weight processing module 122 calculates multiple transmission weights for controlling the transmission directivity of the array antenna 110. The transmission-weight processing module 122 sets the calculated multiple transmission weights to the multiple transmission signals generated by the transmission-signal generating module 120. The transmission-weight processing module 122 outputs the multiple transmission signals to which the multiple transmission weights have been set to the wireless processing module 11.

The reception-weight processing module 123 calculates multiple reception weights for controlling the reception directivity of the array antenna 110. The reception-weight processing module 123 sets the calculated multiple transmission weights to the multiple received signals input from the wireless processing module 11. The reception-weight processing module 123 synthesizes the multiple received signals to which the multiple reception weights have been set to generate new received signals.

The reception-data acquiring module 121 performs a demodulation process, and the like on the new received signals generated by the reception-weight processing module 123 and acquires the control data and user data comprised in the received signals.

The communication module 13 performs communication with the mobile phone 2 while adaptively controlling the directivity of the array antenna 110 and is configured by the wireless processing module 11, the transmission-weight processing module 122, and the reception-weight processing module 123. When communicating with the mobile phone 2, the communication module 13 controls both the reception directivity and the transmission directivity of the array antenna 110. Specifically, by adjusting the reception weights by which the received signals are multiplied in the reception-weight processing module 123, the communication module 13 controls the reception directivity of the array antenna 110. Moreover, by adjusting the transmission weights by which the transmission signals are multiplied in the transmission-weight processing module 122, the communication module 13 controls the transmission directivity of the array antenna 110. The transmission weights may be obtained from the reception weights, and the reception weights may be obtained based on known signals such as pilot signals output from the mobile phone 2.

Based on the received signals received by the communication module 13, the interference-count acquiring module 124 obtains a number of interference sources transmitting interference waves to the base station 1. For example, the interference-count acquiring module 124 obtains the number of interference sources based on any one of the multiple received signals that are output from the wireless processing module 11 and received by the multiple antennas. The method of obtaining the number of interference sources is described in more detail below.

The reception-power acquiring module 125 obtains the reception power of the received signals from the mobile phone 2, which is the communication target, that are received by the communication module 13. For example, the reception-power acquiring module 125 obtains amplitudes (sizes) of multiple known signals (known complex signals) that are output from the wireless processing module 11 and each received by the multiple antennas 110*a*, and uses a total sum of these amplitudes as the reception power of the received signals received by the communication module 13.

The memory 126 may be any suitable data storage area with suitable amount of memory that is formatted to support the operation of an electronic device such as the base station 1. The memory 126 is configured to store, maintain, and provide data as needed to support the functionality of the base station 1 in the manner described below. In practical embodiments, the memory 126 may comprise, for example but without limitation, a non-volatile storage device (non-volatile semiconductor memory, hard disk device, optical disk device, and the like), a random access storage device (for example, SRAM, DRAM), or any other form of storage medium known in the art.

The base station 1 performs both beam-forming and null-steering in relation to the control of the transmission directivity of the array antenna 110 (hereinafter also referred to as "array transmission control"). In beam-forming during transmission, the transmission directivity of the array antenna is controlled so that the beam faces the desired direction (i.e., the direction in which the communication partner device is located). In beam-forming during transmission, null control is intentionally not performed in relation to the transmission directivity of the array antenna, but a null may be formed as a result of controlling the beam.

On the other hand, in null-steering during transmission, the transmission directivity of the array antenna is controlled so that the null faces a direction of suppressed interference (i.e., a direction in which a communication device other than the communication partner device is located). In null-steering during transmission, beam control is intentionally not performed in relation to the transmission directivity of the array antenna, but a beam may be formed as a result of controlling the null. When both beam-forming and null-steering are performed simultaneously in relation to the transmission directivity of the array antenna, both the beam and the null are controlled intentionally.

When the base station 1 communicates with the mobile phone 2 that is the communication target (hereinafter also referred to as "communication target terminal 2"), if a mobile phone 2 that communicates with a surrounding base station 1 (hereinafter also referred to as "surrounding terminal 2") is located at a position near the base station 1, when the base station 1 receives signals from the communication target terminal 2, signals from the surrounding terminal 2 may be received as interference waves and the surrounding terminal 2 may act as an interference source.

Then, when the base station 1 transmits signals to the communication target terminal 2, because the signals may easily reach the surrounding terminal 2 that acts as an interference source during reception, the surrounding terminal 2 becomes a target for controlling interference (hereinafter also referred to as "interference control target"). In other words, in null-steering during the transmission of signals to the communication target terminal 2 of the base station 1, the null is made to face the source of interference during the reception of signals from the communication target terminal 2.

On the other hand, in null-steering during transmission, because a part (a null) where the transmission gain decreases is intentionally formed in the transmission directivity of the array antenna 110, the transmission gain in the desired direction tends to become small due to the effects of this part. Furthermore, in null-steering during transmission, as the number of targets for orienting the null increases, the transmission gain in the desired direction tends to become smaller. Consequently, in null-steering during the transmission of signals to the communication target terminal 2 of the base station 1, as the number of interference sources during reception increases, the transmission gain in relation to the communication target terminal 2 tends to become smaller.

Figure 3:
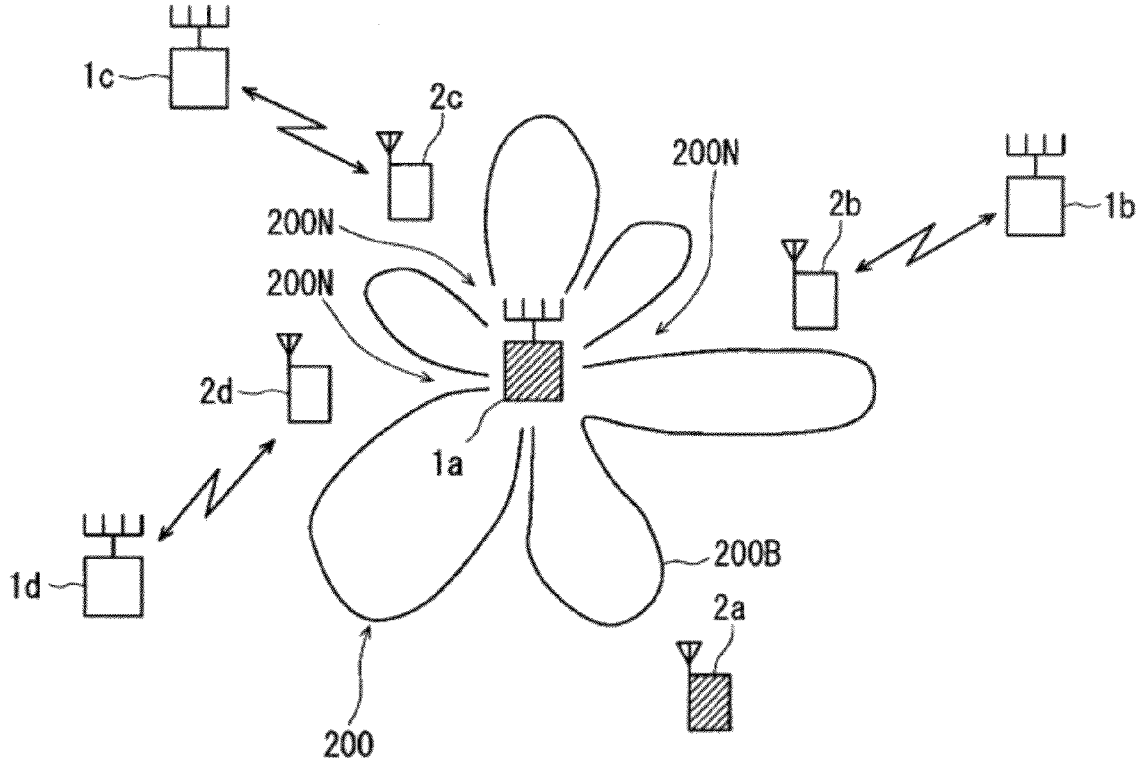
FIG. 3 is an illustration of an exemplary diagram showing a transmission directivity of a base station performing null-steering.

As a result, signals from the base station 1 may not reach the communication target terminal 2 as shown in FIG. 3 below.

FIG. 3 is an illustration of an exemplary diagram showing a transmission directivity of a base station performing null-steering. FIG. 3 shows the transmission directivity 200 of the array antenna 110 when null-steering is performed when the base station 1*a* transmits signals to the communication target terminal 2*a*. In the example of FIG. 3, the surrounding terminal 2*b* that communicates with the surrounding base station 1*b*, the surrounding terminal 2*c* that communicates with the surrounding base station 1*c*, and the surrounding terminal 2*d* that communicates with the surrounding base station 1*d* are all interference sources during reception, and are interference control targets during transmission.

As shown in FIG. 3, in the transmission directivity 200 of the array antenna 110 of the base station 1*a*, the null 200N is faced toward each of the surrounding terminals 2*b*-2*c*. On the other hand, because the number of targets for orienting the null 200N is high, in the transmission directivity 200, the beam 200B does not reach the communication target terminal 2*a* of the base station 1*a*, and transmission signals of the base station 1*a* do not reach the communication target terminal 2*a*.

In this way, in the base station 1, when there are many interference sources, if null-steering is used for array transmission control, signals may not reach the communication target terminal 2. The same applies when both null-steering and beam-forming are performed simultaneously and signals are transmitted from the array antenna 110.

Therefore, in the present embodiment, if the number of interference sources is less than a threshold value, in relation to the transmission directivity of the array antenna 110, at least null-steering is performed from among options of null-steering and beam-forming. If the number of interference sources is greater than the threshold value, in relation to the transmission directivity of the array antenna 110, only beam-forming is performed from among the options of null-steering and beam-forming. However, as described below, if the reception power of received signals from the communication target terminal 2 is equal to or less than a threshold value, regardless of the number of interference sources, only beam-forming is performed in relation to the transmission directivity of the array antenna 110.

Figure 4:
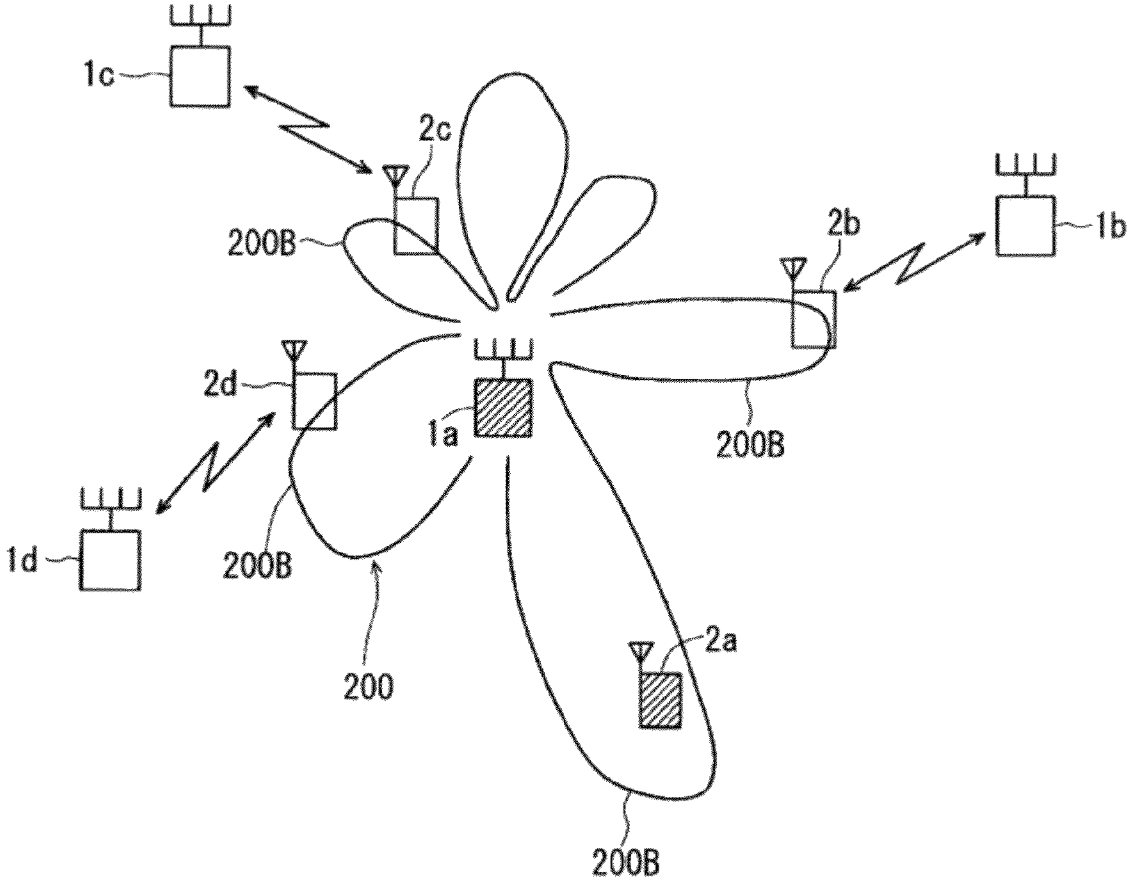
FIG. 4 is an illustration of an exemplary a diagram showing a transmission directivity of a base station performing beam-forming according to an embodiment of the disclosure.

FIG. 4 is an illustration of an exemplary diagram showing a transmission directivity of a base station performing beam-forming according to an embodiment of the disclosure. In contrast to FIG. 3, FIG. 4 shows a base station 1*a* performing only beam-forming when transmitting signals to the communication target terminal 2*a* when the number of interference sources is high. By performing only beam-forming when transmitting signals to the communication target terminal 2*a* when the number of interference sources is high, the base station 1*a* is able to cause the beam 200B related to the transmission directivity 200 of the array antenna 110 to reach the communication target terminal 2*a*. Consequently, the base station 1*a* is able to cause signals to reach the communication target terminal 2*a*. As a result, the transmission performance of the base station 1*a* improves.

When performing only beam-forming, because the null is intentionally not controlled, the beam 200B related to the transmission directivity 200 may reach the surrounding terminals 2*b*-2*d*. As a result, this may impart interference to the surrounding terminals 2*b*-2*d*. However, because the communication target terminal 2*a* is able to assuredly receive the signals from the base station 1*a*, the communication performance between the communication target terminal 2*a* and the base station 1*a* is improved.

In the present embodiment, if the number of interference sources is less than a threshold value, the base station 1 simultaneously performs null-steering and beam-forming when transmitting signals to the communication target terminal 2, for example. Reception weights may be obtained by methods, such as but without limitation, Minimum Mean Square Error (MMSE), Sample Matrix Inversion (SMI), Least Mean Square (LMS), or other method. By calculating the reception weights using the MMSE and calculating the transmission weights based on the reception weights, the communication module 13 of the base station 1 is able to simultaneously perform null-steering and beam-forming during the transmission of signals to the communication target terminal 2.

If the number of interference sources is equal to the threshold value, in relation to the transmission directivity of the array antenna 110, at least null-steering may be performed from among the options of null-steering and beam-forming, or only beam-forming may be performed. In the present embodiment, if the number of interference sources is equal to or greater than the threshold value, only beam-forming is performed in relation to the transmission directivity of the array antenna 110. The threshold value that is compared with the number of interference sources is hereinafter referred to as the "first threshold value".

Figure 5:
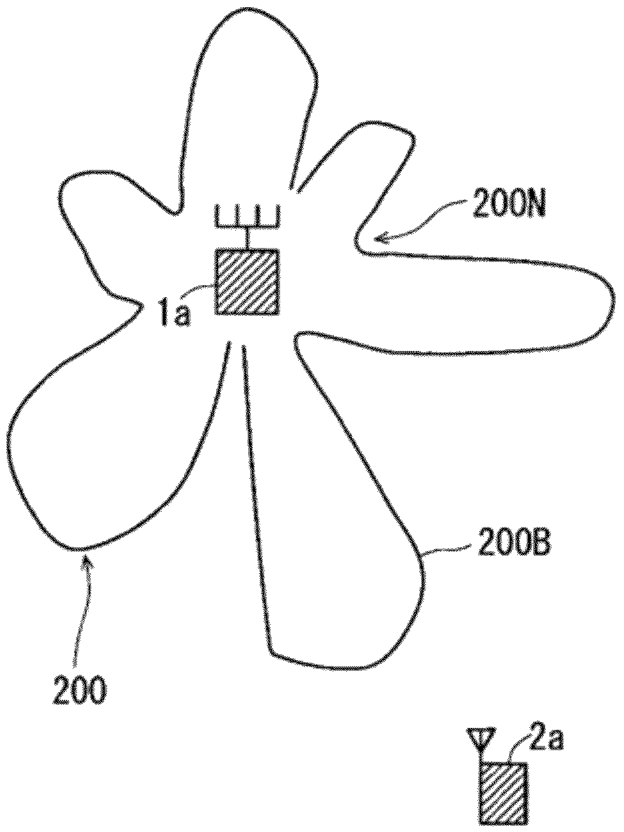
FIG. 5 is an illustration of an exemplary diagram showing a transmission directivity of a base station performing null-steering.

As described above, in null-steering during transmission, because the transmission gain in the desired direction tends to become smaller, if the communication target terminal 2 of the base station 1 is located far from the base station 1, signals from the base station 1 may not reach the communication target terminal 2 as shown in FIG. 5 below.

FIG. 5 is an illustration of an exemplary diagram showing a transmission directivity of a base station performing null-steering. FIG. 5 shows the transmission directivity 200 of the array antenna 110 when null-steering is performed when the base station 1*a* transmits signals to the communication target terminal 2*a* located at position far from the base station 1*a*. In FIG. 5, illustrations of the surrounding terminals 2 are omitted.

In the base station 1*a*, the transmission gain in the direction in which the communication target terminal 2*a* is located is insufficient, and the beam 200B of the transmission directivity 200 does not reach the communication target terminal 2*a*. Consequently, in this case, the transmission signals of the base station 1*a* do not reach the communication target terminal 2*a*.

Therefore, in the base station 1 of the present embodiment, if the reception power of the received signals from the communication target terminal 2 is greater than a threshold value, it is determined that the communication target terminal 2 is located close to the base station 1, and in relation to the transmission directivity of the array antenna 110, at least null-steering is performed from among the options of null-steering and beam-forming. If the reception power of the received signals from the communication target terminal 2 is less than the threshold value, it is determined that the communication target terminal 2 is located far from the base station 1, and in relation to the transmission directivity of the array antenna 110, only beam-forming is performed from among the options of null-steering and beam-forming. However, as described below, even if the reception power of the communication target terminal 2 is greater than the threshold value, if the number of interference sources is equal to or greater than the first threshold value, only beam-forming is performed in relation to the transmission directivity of the array antenna 110.

Figure 6:
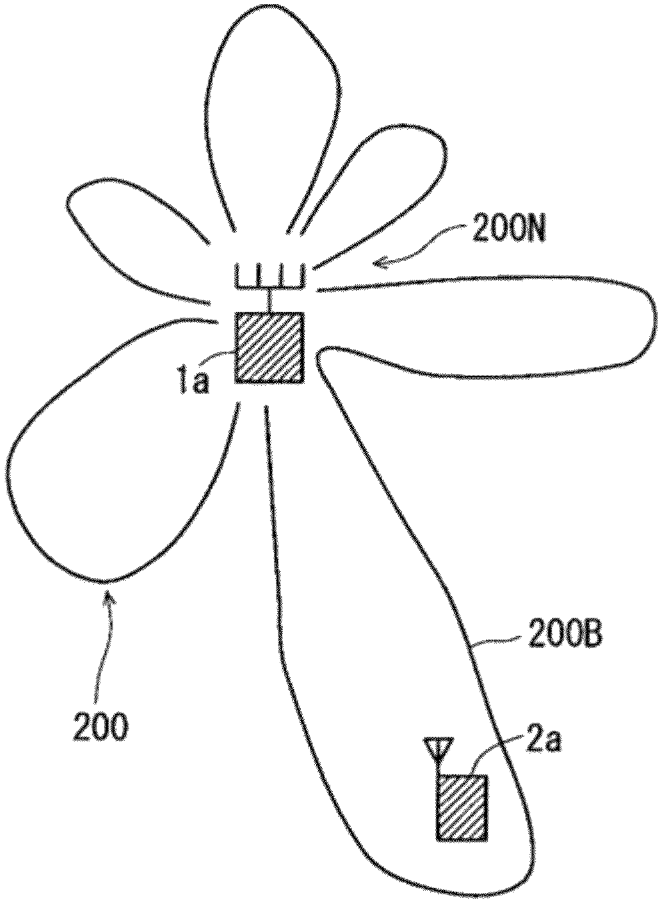
FIG. 6 is an illustration of an exemplary diagram showing a transmission directivity of a base station performing beam-forming according to an embodiment of the disclosure.

FIG. 6 is an illustration of an exemplary diagram showing a transmission directivity of a base station performing beam-forming according to an embodiment of the disclosure. Unlike FIG. 5, FIG. 6 is a diagram showing the base station 1*a* performing only beam-forming when transmitting signals to the communication target terminal 2*a* when the reception power of the communication target terminal 2*a* is less than the threshold value. By performing only beam-forming when transmitting signals to the communication target terminal 2*a* when the reception power of the communication target terminal 2*a* is less than the threshold value, the base station 1*a* causes the beam 200B related to the transmission directivity 200 of the array antenna 110 to reach the communication target terminal 2*a*. Consequently, the base station 1*a* is able to ensure that signals reach the communication target terminal 2*a*. As a result, the transmission performance of the base station 1*a* improves.

In the present embodiment, if the reception power of the received signals from the communication target terminal 2 is greater than the threshold value, the base station 1 simultaneously performs both null-steering and beam-forming when transmitting signals to the communication target terminal 2, for example.

If the reception power of the communication target terminal 2 is equal to the threshold value, in relation to the transmission directivity of the array antenna 110, at least null-steering may be performed from among the options of null-steering and beam-forming, or only beam-forming may be performed. In the present embodiment, if the reception power of the communication target terminal 2 is equal to or less than the threshold value, only beam-forming is performed in relation to the transmission directivity of the array antenna 110. The threshold value that is compared with the reception power of the communication target terminal 2 is hereinafter referred to as the "second threshold value".

Method of Obtaining the Number of Interference Sources—

Next, operations of the interference-count acquiring module 124 will be described. In the following, the base station 1 that is the subject of the description may be referred to as the "subject base station 1".

In the present embodiment, for each of the multiple surrounding base stations 1 positioned in the area near the subject base station 1, of the multiple mobile phones 2 that communicate with the surrounding base stations 1, the one or multiple mobile phones 2 that are located close enough to the subject base station 1 that transmission signals thereof reach the subject base station 1 are each detected as an interference source by the subject base station 1. Consequently, if, for example, six surrounding base stations 1 are located in the area near the subject base station 1, a maximum of six interference sources are detected by the subject base station 1.

In the communication environment 100 of the present embodiment, for each base station 1, a unique word (UW) used by the mobile phone 2 that communicates with the base station 1 is individually assigned. Each of the mobile phones 2 that communicate with the base station 1 transmits the individually assigned unique word to the base station 1. The unique words are known signals used when the base stations 1 synchronize with the mobile phones 2. In the present embodiment, the unique words are used to obtain the number of interference sources. In each of the base stations 1, the unique words assigned to each of the surrounding base stations 1 positioned in the area nearby is acknowledged.

In the subject base station 1, while gradually shifting the position of the unique word in the time direction, the interference-count acquiring module 124 calculates the correlation value of the received signals from the communication target terminal 2 that are output from the wireless processing module 11 and the unique words that are assigned to the surrounding base stations 1. Then, if the maximum value of the calculated correlation value is equal to or greater than a threshold value (i.e., if, among the multiple mobile phones 2 that communicate with the surrounding base station 1 that has been assigned the unique word, there is a mobile phone 2 located near enough to the subject base station 1 that the transmission signals thereof would reach the subject base station 1), it is determined that one interference source is present.

The interference-count acquiring module 124 performs this detection of interference sources by using the multiple unique words that have been assigned to each of the multiple surrounding base stations 1 located in the area near the subject base station 1. As a result, in the interference-count acquiring module 124, the number of interference sources when receiving signals from the communication target terminal 2 is obtained.

Array Transmission Control of Base Station—

Next, a series of operations for when the subject base station 1 performs array transmission control in relation to the communication target terminal 2 is described.

Figure 7:
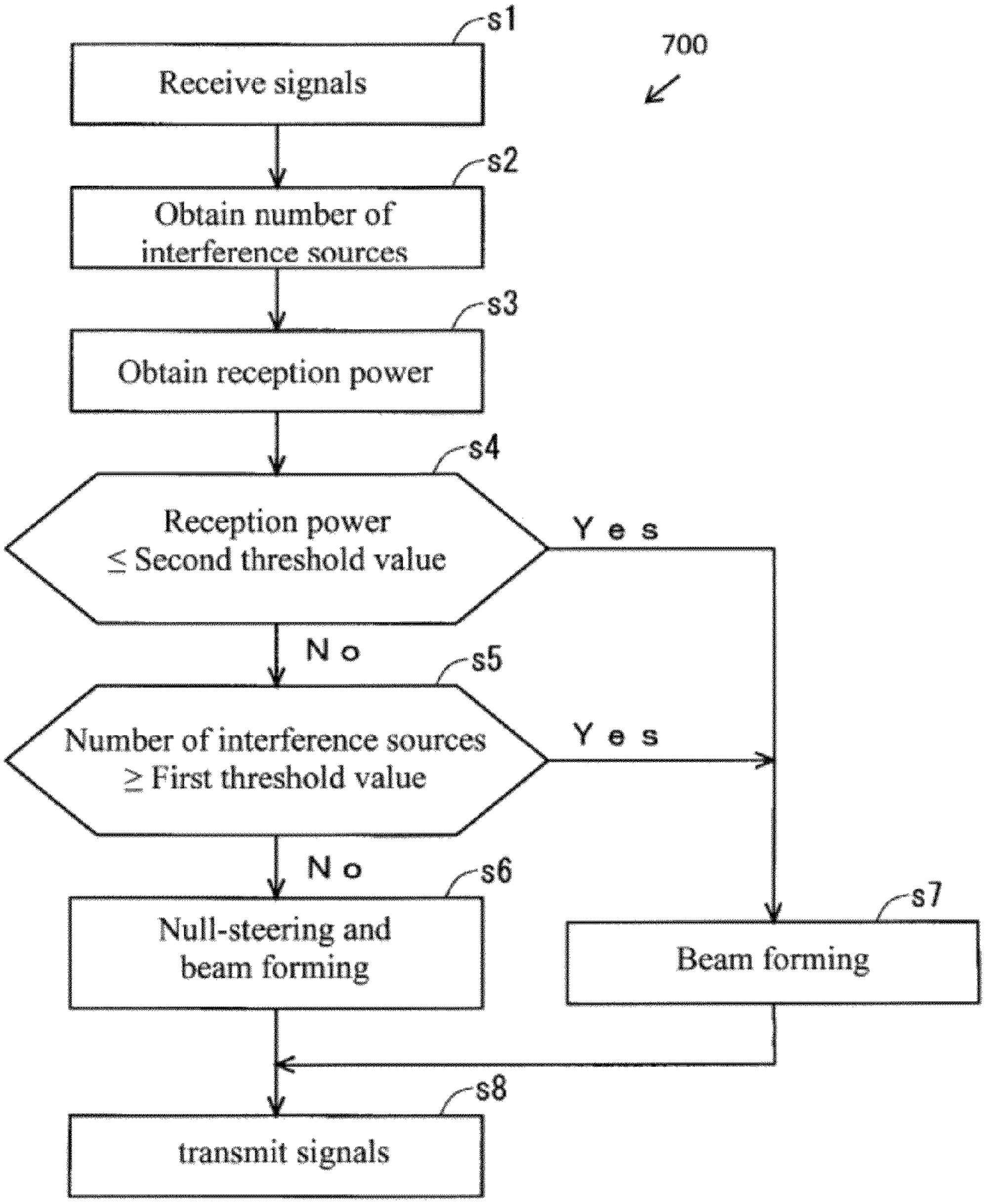
FIG. 7 is an illustration of a flowchart showing a process for operating a base station according to an embodiment of the disclosure.

FIG. 7 is an illustration of a flowchart showing a process 700 for operating a base station according to an embodiment of the disclosure. The various tasks performed in connection with process 700 may be performed, by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the control module 12 in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. For illustrative purposes, the following description of process 700 may refer to elements mentioned above in connection with FIGS. 1-6. In practical embodiments, portions of the process 700 may be performed by different elements of the environment 100 and the base station 1 such as: the antennas 110*a*, the wireless processing module 11, the control module 12, etc. Process 700 may have functions, material, and structures that are similar to the embodiments shown in FIGS. 1-6. Therefore common features, functions, and elements may not be redundantly described here.

In task s1, when the communication module 13 of the subject base station 1 receives received signals from the communication target terminal 2 using the array antenna 110, in task s2, the interference-count acquiring module 124 obtains the number of interference sources based on the received signals in the manner described above.

Next, in task s3, the reception-power acquiring module 125 obtains the reception power of the received signals from the communication target terminal 2 in the manner described above.

Next, in task s4, in the communication module 13, the reception-weight processing module 123 determines whether or not the reception power obtained in task s3 is equal to or less than the second threshold value. In task s4, if it is determined that the reception power is equal to or less than the second threshold value (i.e., if the communication target terminal 2 is located at a position far from the base station 1), the reception-weight processing module 123 of the communication module 13 determines to use beam-forming for array transmission control.

Subsequently, the reception-weight processing module 123 calculates the reception weight using an algorithm corresponding to beam-forming, and the transmission-weight processing module 122 calculates the transmission weight based on the reception weight. The transmission-weight processing module 122 of the present embodiment corrects the reception weight obtained by the reception-weight processing module 123 based on calibration information, and uses the corrected reception weight as the transmission weight.

The calibration information is information generated based on differences in the properties of the transmission system circuit and the reception system circuit of the subject base station 1. Although it is also possible to directly use the reception weight obtained by the reception-weight processing module 123 as the transmission weight, because there are differences in the properties of the transmission system circuit and the reception system circuit (e.g., differences in the properties of the amplifiers of the transmission system circuit and the reception system circuit), by using the calibration information and correcting the reception weight to absorb those differences, an optimum transmission weight may be obtained.

Subsequently, in task s8, the communication module 13 sets the transmission weight obtained in task s7 to the transmission signals, and transmits the transmission signals to which the transmission weight has been set from the array antenna 110. In this way, the subject base station 1 performs only beam-forming when transmitting signals to the communication target terminal 2.

In task s4, if it is determined that the reception power is not equal to or less than the second threshold value (i.e., if the communication target terminal 2 is located at a position near the base station 1), in task s5, the reception-weight processing module 123 of the communication module 13 determines whether or not the number of interference sources acquired by the interference-count acquiring module 124 is equal to or greater than the first threshold value. The first threshold value is set using, for example, the formula $(N-1)/2$, wherein N is the number of the multiple antennas 110*a* composing the array antenna 110. The number of nulls that may be set in the transmission directivity of the array antenna 110 is $(N-1)$.

In task s5, if it is determined that the number of interference sources is equal to or greater than the second threshold value (i.e., if it is determined that there are many interference sources), the abovementioned task s7 is executed and it is determined that beam-forming will be used for array transmission control. Subsequently, task s8 is executed, and the subject base station 1 performs only beam-forming when transmitting signals to the communication target terminal 2.

On the other hand, in task s5, if it is determined that the number of interference sources is not equal to or greater than the second threshold value (i.e., if it is determined that there are few interference sources), in task s6, the reception-weight processing module 123 of the communication module 13 determines to use both null-steering and beam-forming for array transmission control. Subsequently, the reception-weight processing module 123 calculates the reception weight using an algorithm corresponding to both null-steering and beam-forming, such as the MMSE method, and the transmission-weight processing module 122 calculates the transmission weight based on the reception weight.

Subsequently, in task s8, the communication module 13 sets the transmission weight obtained in task s6 to the transmission signals, and transmits the transmission signals to which the transmission weight has been set from the array antenna 110. In this way, the subject base station 1 simultaneously performs both null-steering and beam-forming when transmitting signals to the communication target terminal 2.

As described above, in the base station 1 of the present embodiment, if the number of interference sources is greater than the first threshold value, because only beam-forming is performed in relation to the transmission directivity of the array antenna 110, it is possible to cause beams related to the transmission directivity 200 of the array antenna 110 to reach the communication target terminal 2 and to assuredly send signals to the communication target terminal 2. As a result, the transmission performance of the base station 1 improves.

Moreover, in the base station 1 of the present embodiment, if the reception power of received signals from the communication target terminal 2 is less than the second threshold value, because only beam-forming is performed in relation to the transmission directivity of the array antenna 110, it is possible to cause beams related to the transmission directivity 200 of the array antenna 110 to reach the communication target terminal 2 and to assuredly send signals to the communication target terminal 2. As a result, the transmission performance of the base station 1 improves.

In the present embodiment, the system of array transmission control is determined using both the number of interference sources and the reception power of the communication target terminal 2, but the system of array transmission control may be determined using only one of either the number of interference sources or the reception power of the communication target terminal 2.

From among the options of the number of interference sources or the reception power of the communication target terminal 2, if using only the number of interference sources, if, for example, the number of interference sources is less than the first threshold value, both null-steering and beam-forming are used for array transmission control, and if the number of interference sources is equal to or greater than the first threshold value, only beam-forming is used for array transmission control.

From among the options of the number of interference sources or the reception power of the communication target terminal 2, if using only the reception power, if, for example, the reception power is greater than the second threshold value, both null-steering and beam-forming are used for array transmission control, and if the reception power is equal to or less than the second threshold value, only beam-forming is used for array transmission control.

In the present embodiment, when the base station 1 simultaneously performs both null-steering and beam-forming when transmitting signals to the communication target terminal 2, the suppressing effect of the null-steering may be adjusted. In other words, the transmission gain in the directions of suppressed interference in the transmission directivity of the array antenna 110 may be adjusted. When the suppressing effect of the null-steering is reduced, the transmission gain in the desired direction tends to increase. When simultaneously performing both null-steering and beam-forming using MMSE methods such as the abovementioned SMI or LMS, the system used to calculate the reception weight includes a parameter (hereinafter referred to as the "array parameter") that is able to adjust the directivity of the array antenna 110. By adjusting the value of this array parameter, the suppressing effect of the null-steering can be adjusted.

Figure 8:
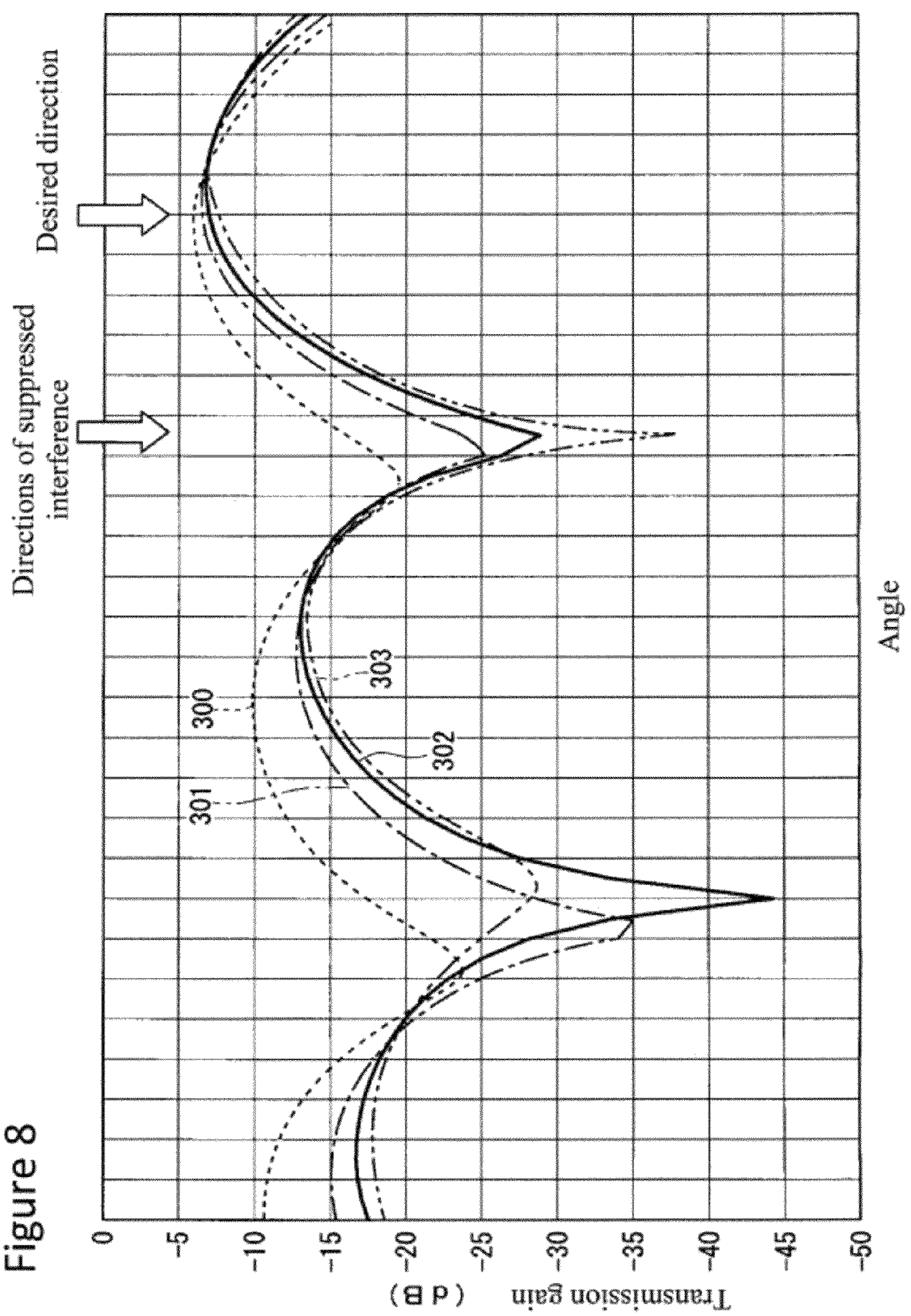
FIG. 8 is an illustration of a graph showing a transmission directivity of a base station when a suppressing effect of null-steering has been changed according to an embodiment of the disclosure.

FIG. 8 an illustration of a graph showing the transmission directivity of a base station when the suppressing effect of null-steering has been changed according to an embodiment of the disclosure. FIG. 8 is a diagram showing the transmission directivity of the array antenna 110 when, in a case in which the base station 1 simultaneously performs both null-steering and beam-forming when transmitting signals to the communication target terminal 2, the suppressing effect of the null-steering has been changed.

In FIG. 8, the peripheral directions of the array antenna 110 are represented on the horizontal axis by the angles, and on the vertical axis, the relative transmission gains of the array antenna 110 relative to a prescribed standard value in the directions (angles) shown in the horizontal axis are shown. In FIG. 8, the suppressing effect of the null-steering decreases in the order of the transmission directivity property 303 indicated with the double-dash line, the transmission directivity property 302 indicated with the solid line, the transmission directivity property 301 indicated with the dashed line, and the transmission directivity property 300 indicated with the wavy line. In other words, the transmission gain of the array antenna 110 in the interference direction is becoming smaller in this order.

When the suppressing effect of the null-steering is decreased when simultaneously performing both null-steering and beam-forming, the gain of the array antenna 110 in the desired direction tends to increase.

Therefore, when the base station 1 controls the transmission directivity of the array antenna 110 and transmits signals to the communication target terminal 2, it always simultaneously performs both null-steering and beam-forming, and the higher the number of interference sources, the more the base station 1 may decrease the suppressing effect of the null-steering. For example, as array parameter values, four values producing different suppressing effects of null-steering when used to calculate the transmission weight are stored in advance in the communication module 13. Then, if the number of interference sources is zero, the communication module 13 calculates the transmission weight using the array parameter value producing the highest suppressing effect of null-steering (more precisely, it calculates the reception weight based on the array parameter value and calculates the transmission weight based on the reception weight).

If the number of interference sources is "1", the communication module 13 calculates the transmission weight using the array parameter value producing the next highest suppressing effect of null-steering, and if the number of interference sources is "2", it calculates the transmission weight using the array parameter value producing the next highest suppressing effect of null-steering. If the number of interference sources is "3" or more, it calculates the transmission weight using the array parameter value producing the lowest suppressing effect of null-steering.

In this way, by reducing the suppressing effect of the null-steering in proportion to the number of interference sources, it is possible to prevent decreases in the transmission gain of the array antenna 110 in the desired direction caused by increases in the number of interference sources. In this way, it is possible to cause beams related to the transmission directivity of the array antenna 110 to reach the communication target terminal 2 and to assuredly send signals to the communication target terminal 2. As a result, the transmission performance of the base station 1 may be improved.

If the base station 1 controls the transmission directivity of the array antenna 110 and transmits signals to the communication target terminal 2, both null-steering and beam-forming are always simultaneously performed, and the lower the reception power of the received signals from the communication target terminal 2, the lower the suppressing effect of the null-steering may be reduced. Specific examples of methods of reducing the suppressing effect of the null-steering are the same as those for the abovementioned cases of using the number of interference sources. In this way, it is possible to cause beams related to the transmission directivity of the array antenna 110 to reach the communication target terminal 2 and to assuredly send signals to the communication target terminal 2. As a result, the transmission performance of the base station 1 may be improved.

In the present embodiment, among the multiple mobile phones 2 that communicate with the surrounding base stations 1 located in the area near the subject base station 1, if a mobile phone 2 that imparts interference to the subject base station 1 is present, regardless of the number of such mobile phones 2, it is determined that one interference source is present, but if there are multiple mobile phones 2 imparting interference to the subject base station 1, each of the multiple mobile phones 2 may be independently determined to be an interference source.

In this document, the terms "computer program product", "computer-readable medium", and the like may be used generally to refer to media such as, for example, memory, storage devices, or storage unit. These and other forms of computer-readable media may be involved in storing one or more instructions for use by the control module 12 to cause the control module 12 to perform specified operations. Such instructions, generally referred to as "computer program code" or "program code" (which may be grouped in the form of computer programs or other groupings), when executed, enable a method of using a system such as the base station 1.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A communication device comprising:

an interference-count acquiring module configured to obtain a number of interference sources based on received signals received by the communication device; and a communication module configured to:

perform communication using a plurality of antennas and control a transmission directivity of the antennas when transmitting signals;

perform at least null-steering from among null-steering and beam-forming in relation to the transmission directivity of the antennas, when the number of interference sources is less than a first threshold value; and perform only the beam-forming without the null-steering in relation to the transmission directivity of the antennas, when the number of interference sources is greater than the first threshold value.

2. The communication device according to claim 1, further comprising a reception-power acquiring module configured to obtain a reception power of the received signals from a communication partner.

3. The communication device according to claim 2, wherein the communication module is further configured to:

perform at least the null-steering from among the null-steering and the beam-forming, if the reception power is greater than a second threshold value and the number of interference sources is less than the first threshold value; and perform only the beam-forming without the null-steering, if the reception power is less than the second threshold value and the number of interference sources is greater than the first threshold value.

4. A communication device comprising:

a communication module configured to:

perform communication using a plurality of antennas and simultaneously perform null-steering and beam-forming in relation to a transmission directivity of the antennas when transmitting signals; and reduce a suppressing effect from the null-steering when a number of interference sources is greater than a first threshold value; and an interference-count acquiring module configured to obtain the number of interference sources based on received signals received by the communication module.

5. A communication device comprising:

a reception-power acquiring module configured to obtain a reception power of received signals from a communication partner device received by the communication device; and a communication module configured to:

perform communication using a plurality of antennas and control a transmission directivity of the antennas when transmitting signals;

perform at least null-steering from among null-steering and beam-forming in relation to the transmission directivity when transmitting signals to the communication partner device, if the reception power is greater than a threshold value; and perform only the beam-forming without the null-steering in relation to the transmission directivity of the antennas when transmitting signals to the communication partner device, if the reception power is less than the threshold value.

6. A communication device comprising:

a reception-power acquiring module configured to obtain a reception power of received signals from a communication partner device that are received by the communication device; and a communication module configured to:

perform communication using a plurality of antennas and control a transmission directivity of the antennas when transmitting signals; and perform null-steering and beam-forming in relation to the transmission directivity of the antennas when transmitting signals to the communication partner device, and reduce a suppressing effect of the null-steering when the reception power is less than a threshold.

7. A method for operating a communication device, the method comprising:

obtaining a number of interference sources based on received signals;

performing a communication using a plurality of antennas and controlling a transmission directivity of the antennas when transmitting signals;

performing at least null-steering from among null-steering and beam-forming in relation to the transmission directivity of the antennas, when the number of interference sources is less than a first threshold value; and performing only the beam-forming without the null-steering in relation to the transmission directivity of the antennas, when the number of interference sources is greater than the first threshold value.

8. The method of claim 7, further comprising obtaining a reception power of the received signals from a communication partner.

9. The method of claim 8, further comprising:

performing at least the null-steering from among the null-steering and the beam-forming, if the reception power is greater than a second threshold value and the number of interference sources is less than the first threshold value; and performing only the beam-forming without the null-steering, if the reception power is less than the second threshold value and the number of interference sources is greater than the first threshold value.

10. A computer readable storage medium comprising computer-executable instructions for operating a communication device, the method executed by the computer-executable instructions comprising:

obtaining a number of interference sources based on received signals;

performing a communication using a plurality of antennas and controlling a transmission directivity of the antennas when transmitting signals;

performing at least null-steering from among null-steering and beam-forming in relation to the transmission directivity of the antennas, when the number of interference sources is less than a first threshold value; and performing only the beam-forming without the null-steering in relation to the transmission directivity of the antennas, when the number of interference sources is greater than the first threshold value.

11. The computer readable storage medium of claim 10, further comprising obtaining a reception power of the received signals from a communication partner.

12. The computer readable storage medium of claim 11, further comprising:

performing at least the null-steering from among the null-steering and the beam-forming, if the reception power is greater than a second threshold value and the number of interference sources is less than the first threshold value; and performing only the beam-forming without the null-steering, if the reception power is less than the second threshold value and the number of interference sources is greater than the first threshold value.

13. A computer readable storage medium comprising computer-executable instructions for operating a communication device, the method executed by the computer-executable instructions comprising:

obtaining a number of interference sources based on received signals;

performing communication using a plurality of antennas and simultaneously performing null-steering and beam-forming in relation to a transmission directivity of the antennas when transmitting signals; and reducing a suppressing effect from the null-steering when the number of interference sources is greater than a first threshold value.

14. A computer readable storage medium comprising computer-executable instructions for operating a communication device, the method executed by the computer-executable instructions comprising:

obtaining a reception power of received signals from a communication partner device received by the communication device;

performing communication using a plurality of antennas and control a transmission directivity of the antennas when transmitting signals;

performing at least null-steering from among a null-steering and beam-forming, if the reception power is greater than a threshold value, in relation to the transmission directivity when transmitting signals to the communication partner device; and performing only the beam-forming without the null-steering, if the reception power is less than the threshold value, in relation to the transmission directivity of the antennas when transmitting signals to the communication partner device.

15. A computer readable storage medium comprising computer-executable instructions for operating a communication device, the method executed by the computer-executable instructions comprising:

obtaining a reception power of received signals from a communication partner device that are received by the communication device;

performing communication using a plurality of antennas and control a transmission directivity of the antennas when transmitting signals;

performing null-steering and beam-forming in relation to the transmission directivity of the antennas when transmitting signals to the communication partner device; and reducing a suppressing effect of the null-steering when the reception power is less than a threshold.

* * * * *